United States Patent Office 3,183,984
Patented May 18, 1965

3,183,984
APPARATUS AND METHOD FOR SETTING HYDROSTATIC PRESSURE RELIEF VALVES THROUGH WEARING LININGS
Harry D. Durston, Pasco, and Alfred Perry, Moses Lake, Wash., assignors to J. A. Terteling & Sons, Inc., Boise, Idaho, a corporation of Idaho
Filed Oct. 5, 1964, Ser. No. 401,481
9 Claims. (Cl. 175—57)

The present invention relates to mechanism for piercing the earth and linings thereof, and for setting objects therein, and, more particularly, to a piercing and setting machine operable to place hydrostatic pressure relief valves in the wearing blanket or lining of such surface structures as roads, runways, channels, canals and the like.

When wearing blankets or linings, such as asphalt, concrete, etc. are placed upon an earth foundation, they inherently act as barriers to moisture moving within the earth mass underneath. It is commonly known that such moisture is under pressure, called hydraulic head, and that such moisture tends to move or flow toward a lower elevation. In water conduits such as channels or canals, percolation may take place under the influence either of gravity, creating a hydraulic head, or of downward capillary forces. Water from both causes joins and moves together with ground water normally present in the earth.

Each of these various phenomena tends to cause hydrostatic pressures against the barrier provided by the surface blanket or lining, and, under any one of many different conditions, may tend to push out or break the blanket or lining. For this reason, it is desirable to provide pressure-relieving means in the blanket or lining, so that subterranean hydrostatic pressures which become greater than the downward forces exerted on the surface structure by the lining may be relieved.

Pressure-relieving means which have been useful for this purpose in the past consist of so-called weep or flap valves which comprise a perforated hollow stem member, a mounting flange member, and a weighted gate or flap closure member covering the central chamber which extends down into the stem member. The engineering and economic design criteria for these valves are such that cheap and fragile materials are used in fabrication, with the result that 40–60% breakage of such units commonly occurs during the placement or setting operations performed by the methods and machines formerly known in the art. Moreover, placement is relatively slow by such prior means. In fact, the method of piercing or drilling employed heretofore has generally consisted of driving a pipe through the lining and into the subjacent earth, and then inserting the valves in the resultant holes by hand. By reason of partial or complete collapse of the hole lining when the pipe is withdrawn, and while the valves are being set, insertion is relatively difficult and fracture of the valve is often caused when pressure is applied to reform the previously-drilled hole. Moreover, the hydrostatic pressures exerted upon the lining are also directed against the valves and tend to cause them to pop out of position during use.

It is an object of the present invention to provide a machine which will economically set weep valves in a wearing blanket or lining of a surface structure. A further object is to set such valves in accurate fashion, while avoiding substantial breakage. A further object is to expeditiously set weep valves in sequence and in appropriating timing arrangement with allied or associated apparatus.

Another object of the present invention is to provide a machine which will punch a hole or passage in plastic or semi-plastic blanket or lining material, and further into densified material of an earth foundation, and set a weep valve in said hole, with a minimum of hand operations. A further object of the invention is to provide for consolidation of the earth around the weep valve when it is set in position.

Another object of the invention is to provide a machine which will remain stationary while its carrier moves forwardly so that the valve may be set in position while associated equipment is continuously moving in a forward direction. A further object of the invention is to provide a machine which will perform all the operations sequentially and repetitively in at least semi-automatic fashion.

The apparatus of the invention, broadly described, comprises a piercing and setting member, together with means for driving that member vertically through the lining, and means for vibrating the member in a generally horizontal plane. The member is first driven through the lining to form the placement hole or passage for the weep valve and is then retracted and the valve set on the member for placement during the second downward movement of the point. Further features of the invention are the mounting of the piercing and setting subassembly for reciprocation, as well as for horizontal movement with respect to a member by which the entire mechanism may be driven along the earth.

The invention will now be more fully described in conjunction with drawings showing preferred embodiments thereof, from which the attainment of the above and various other objects by the apparatus of the invention will be manifest.

In a preferred embodiment of the present invention the assembly includes a mounting frame generally identified at A, a raising and lowering assembly B, which is mounted on frame A for horizontal movement with respect thereto, and a piercing-setting mechanism C which is vertically reciprocable with respect to the raising and lowering assembly B.

Figure 1:
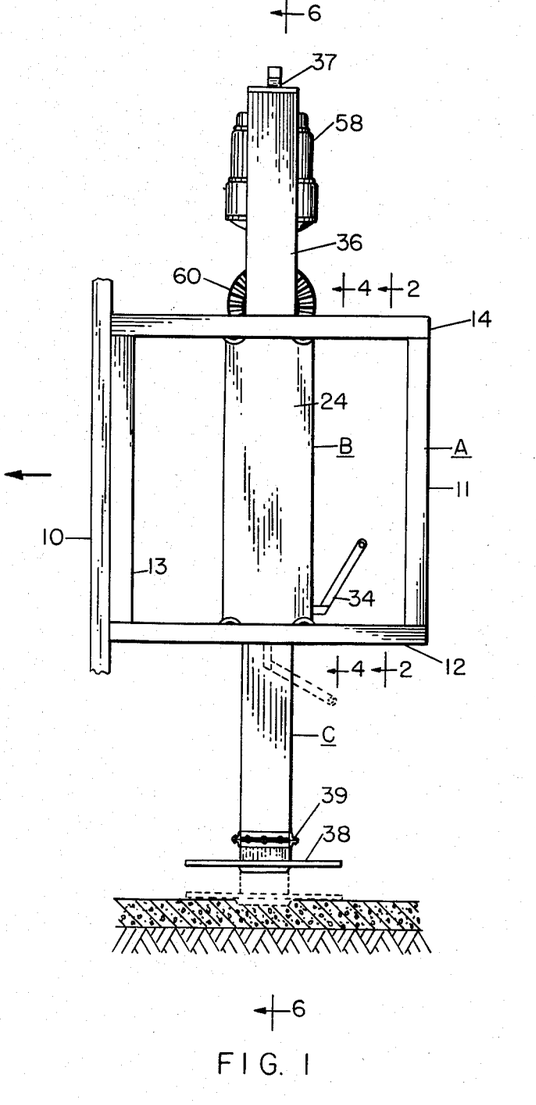
FIG. 1 is a side vertical elevational view of the apparatus of the invention.

The assembly or unit A, forming a mounting frame, is intended to be attached to the aft end of a carrier one of whose parts is generally indicated at 10 and referred to hereinafter as a driving member. The carrier may be such as a slip form paving machine, an up-slope paver of the type disclosed in application Serial No. 341,694 filed January 31, 1964, or the like. At any rate, the carrier is such as would be moved in a horizontal direction indicated by the arrow in FIG. 1, such movement possibly taking place during the operation of the piercing-setting mechanism. For this purpose, as will be fully described hereinafter, the unit B, the raising and lowering assembly, is capable of remaining in fixed horizontal position, while the unit A is moved forwardly with the member 10.

The mounting frame comprises a box-like framework made up of inwardly facing angle iron members consecutively numbered 11–22 and welded (or otherwise suitably fastened) together. As shown to advantage in the cross-sectional view of FIG. 2, the upper and lower side members of the framework (12 14, 15, 17) provide rails forming trackways upon which wheels of the raising and lowering subassembly or carriage means B may ride.

Figure 2:
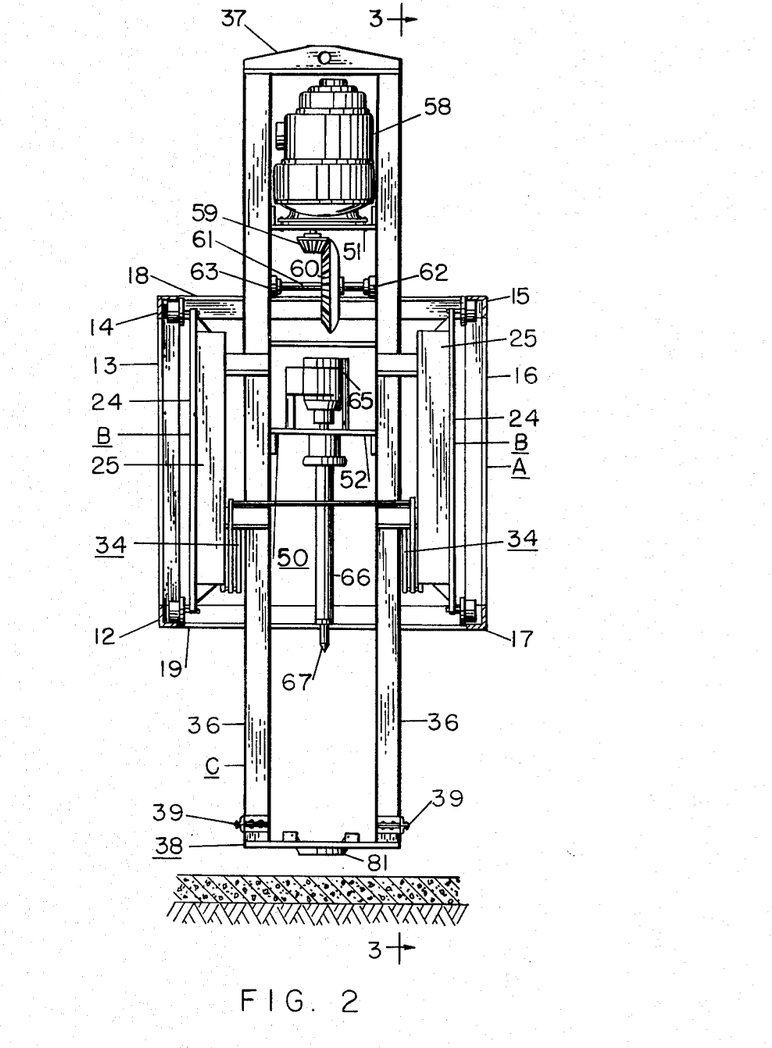
FIG. 2 is a sectional view taken along line 2—2 of FIG. 1.
Figure 3:
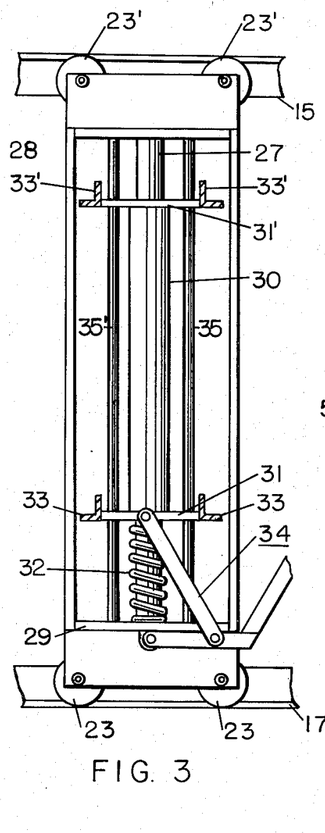
FIG. 3 is a side elevational view, to a larger scale, of a portion of the apparatus of the preceding figures taken generally along the line 3—3 of FIG. 2.
Figure 4:
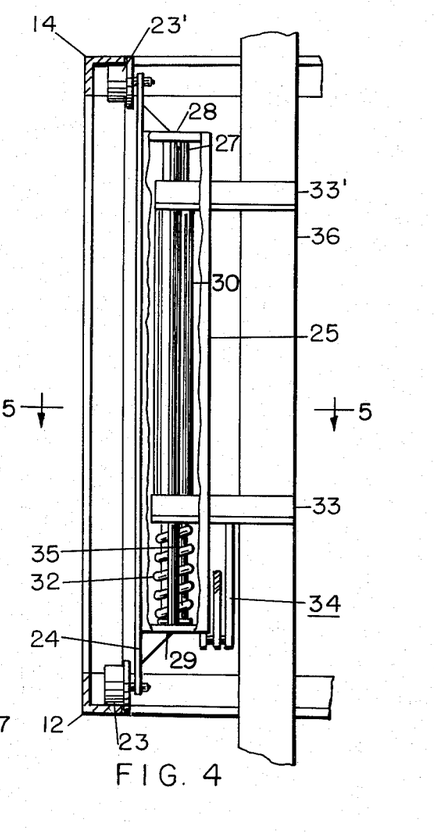
FIG. 4 is a partial sectional view taken along line 4—4 of FIG. 1.
Figure 5:
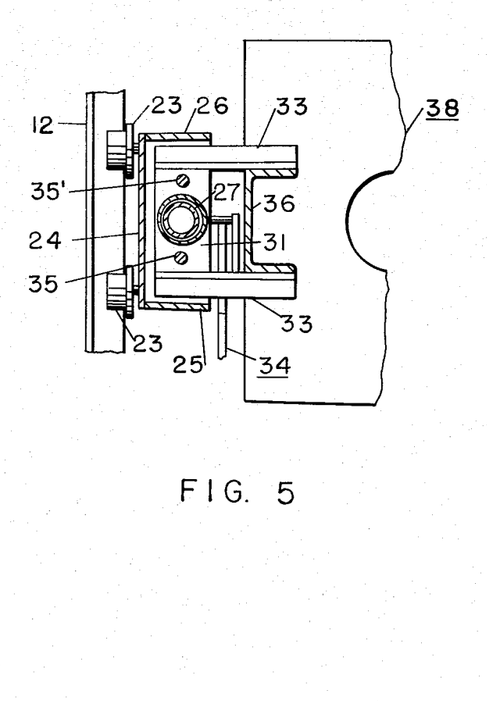
FIG. 5 is a cross sectional view taken along line 5—5 of FIG. 4.

The unit B, as particularly shown in FIG. 2, comprises a pair of resiliently-supported carriers frames, each of which is mounted on wheels and securely fixed to the piercing-setting mechanism C. Since each frame of unit B is identical, description of one only will suffice. Referring particularly now to FIGS. 3, 4 and 5, the subassembly includes a side plate member 24 through which are journaled pairs of wheels 23 and 23', respectively at the top and bottom of the member 24. The wheels evidently form the supporting members for the plate member 24. The lower wheels 23 ride upon the lower side member 12 or 17 of the mounting frame A, while the upper pair of wheels 23' ride upon the upper side member 14 or 15 of the frame.

As best shown in FIG. 5, the side plate member 24, together with attached plate members 25 and 26, provides a U-shaped frame housing for the raising and lowering portion of the unit B. A cylindrical support column 27 is disposed between upper mounting plate 28 and lower mounting plate 29, which are welded or otherwise suitably fastened to this U-shaped frame housing. An inner frame includes a coupler sleeve member 30 disposed between a pair of horizontal support plates 31 and 31', the coupler sleeve member being fitted around the column 27.

A compression spring member 32 around column 27 is disposed between the lower mounting plate 29 of the U-shaped frame housing, and the lower support plate 31 of the inner mounting frame, to hold the inner mounting frame at an elevation above the bottom of the U-shaped frame housing. A pair of support brackets 33 are welded, or otherwise suitably fastened, to the respective front and rear portions of these inner mounting support plates 31, while a corresponding pair of support brackets 33' are fastened to the corresponding portion of the upper support plate 31'. All of the brackets 33 and 33' are suitably fastened to frame member 36 of the vertically-extending support assembly of the piercing-setting mechanism C, hereinafter described.

In order to provide for raising and lowering of the inner mounting frame including the plate 31, and therefore the support assembly including frame member 36, a compound lever assembly generally designated at 34 is disposed adjacent the lower end of the inner mounting frame and pivotally fixed to the lower plate 29 of the U-shaped outer housing frame. The compound lever assembly is of familiar configuration and is attached to the plate 31 of the inner mounting frame in such fashion that, when the handle is depressed, (as shown in dotted lines in FIG. 1) the mechanism of the piercing-setting unit C is lowered into operating position while the spring 32 is compressed. When the lever 34 is raised, spring 32 returns the unit C to its normal position for transport.

A pair of guide rods 35 and 35' are provided to assure alignment of the inner mounting frame in the U-shaped frame housing. These rods extend between the upper plate 28 and the lower plate 29 of the housing.

It will be evident that a piston arrangement, or a jack screw arrangement, could be employed in place of the raising and lowering mechanism specifically shown in the drawings and including the compound lever assembly 34.

Figure 6:
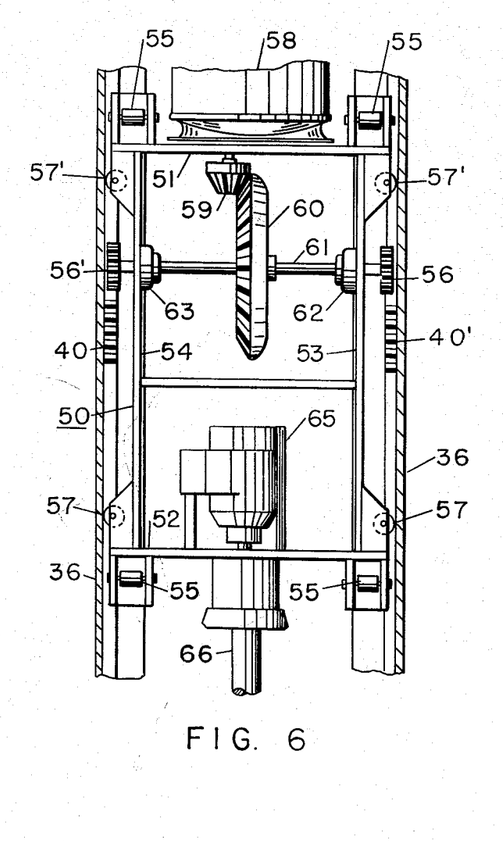
FIG. 6 is a partial sectional view taken along line 6—6 of FIG. 1.

The piercing-setting mechanism C is shown to greater advantage in FIGS. 2 and 6, and includes a pair of the vertically-extending frame members 36 within which a reciprocable frame unit 50 operates. The frame members 36 are held in parallel spaced relationship to each other at the top by a header plate 37 which is welded or otherwise suitably fastened thereto. At the bottom a piercing-setting template member 38 is similarly fixed to the bottom ends of the channel guides, with the guides spaced apart to provide for movement of the piercing-setting mechanism therebetween. Mating flanges 39 may provide for the bolted attachment of the template member to the guides. The frame member 36 and associated members form a vertically-extending support assembly which carries the reciprocable unit now to be described.

The vertically reciprocable movement of the piercing-setting mechanism C is provided for by gear racks 40 and 40' which are mounted on the back inside flanges of the respective frame members 36, which act as channel guides.

The reciprocable frame portion 50 of the piercing-setting mechanism is a rectangular framework having a top mounting plate 51, a bottom mounting plate 52 and side plates 53 and 54, all attached to each other. A pair of rotatably mounted guide rollers 55 is provided on the front edges of each of the mounting plates 51 and 52 to engage the adjacent surfaces of channel guides 36. Also, pinion gears 56 and 56' are to be held in engagement with respective racks 40 and 40' on the guides 36 as will be later described. Similarly, sets of upper and lower roller guides 57 and 57' are provided at the tops and bottoms of the side plates 53 and 54, to engage the side walls of channel guides 36 thereby to act with guide rollers 55 to assure proper alignment of the frame portion 50.

A suitable driving means such as the reversible gear motor 58 is mounted on the upper mounting plate 51 and has a pinion bevel gear 59 fixed to its shaft. A mating bevel gear 60 is fixed on a shaft 61 which is in turn journaled through flange type bearings 62 and 63 which are bolted or otherwise suitably fastened to the respective side plates 53 and 54 of the assembly. The ends of shaft 61 carry respective pinion gears 56 and 56' which, as above stated, are in engagement with racks 40 and 40', respectively, on the channel guides 36.

When power is furnished to the motor 58, its shaft rotates to drive the pinion 59 and thereby, through the gear 60, to rotate the shaft 61 and the gears 56 and 56'. The result is that the reciprocable frame 50 is driven vertically upward or downwardly, depending upon the direction of rotation of the driving motor. It will be understood, however, that other types of reciprocable driving arrangements could be employed, including hydraulic and pneumatic motors, and electro-mechanical means. Indeed, piston and jack screw arrangements could likewise be employed.

The actual piercing-setting assembly comprises a vibrator motor 65 which is mounted on the top of plate 52 of the driving frame 50, and a piercing-setting member 66 which includes an attached piercing-setting point 67. As is shown more fully in FIGS. 7–11, the member 66 is appropriately fixed to the bottom of the mounting plate 52 of the reciprocable assembly and is of cylindrical configuration. The piercing-setting point 67 is attached to the lower end of portion 66. The vibrator motor 65 has a shaft 65' which extends into the cylindrical chamber 68.

Figures 7, 8, 9:
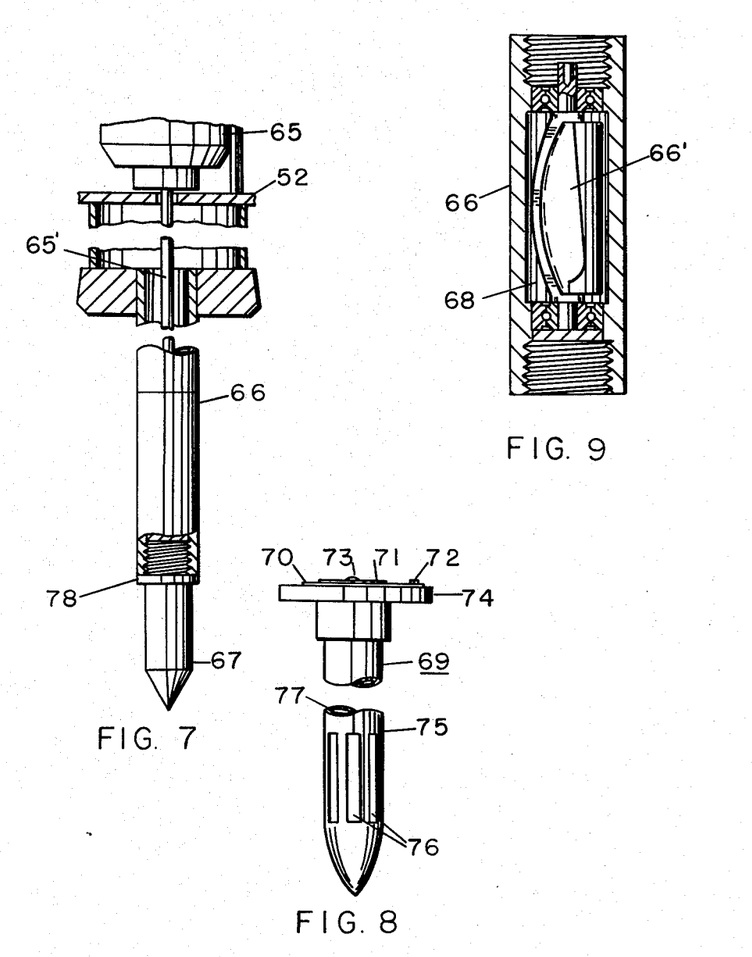
FIG. 7 is a partial sectional view showing the vibrating and piercing-setting member apparatus of the invention.
FIG. 8 is an elevational view of a weep valve of the type particularly designed to be set by the apparatus of the invention.
FIG. 9 is a cross-sectional view of a portion of the piercing-setting member, showing a vibrator eccentric particularly useful with the apparatus of the invention.

The shaft 65' drives a vibrator mechanism of the type disclosed in our co-pending application Serial No. 341,694, filed January 31, 1964. Indeed, FIG. 9 of the present application is analogous in disclosure to FIG. 14 of the co-pending application, except that the vibrator unit of this application is disposed for vertical operation and is shown as having only a single vibrator subassembly, whereas the prior application contemplated a series of such units connected together. Moreover, the weighted body portion 65A of the vibrator unit of FIG. 9 is not of symmetrical form from end-to-end, but rather is larger, and therefore more heavy, at the lower end. This is provided for in order that a larger vibratory force will be supplied at the lower end, since the vibrator is to be used in conjunction with the drilling and setting operations to be described.

With a vibrator of the type shown in FIG. 9, a single 18" long vibrator section has been proved to be capable of appropriately piercing the lining and subjacent earth and setting therein a three-foot weep valve.

It is not essential that the particular type of vibrator shown in FIG. 9 be employed. Rather, the well-known "stinger" 66A shown in FIG. 10 may be employed as a vibrator for this purpose and may merely be inserted into the sleeve 68. Nevertheless, it has been found in practice that this type of vibrator provides a substantial amount of wear due to heat and friction, and that the integral vibrator unit 66' of FIGS. 7 and 9 is preferable.

Figure 11:
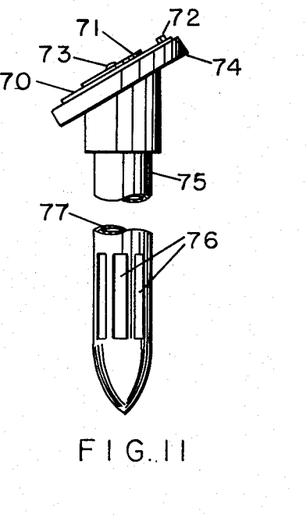
FIG. 11 is an elevational view of a weep valve designed for use in sloped settings, and for cooperation with the apparatus of FIG. 10.

FIGS. 8 and 11 show the type of weep valve which is particularly designed to be set by the apparatus of the present invention. The valve shown in FIG. 8 is the type used in flat or plane surface structures such as canal bottoms, roads or the like, while the valve shown in FIG. 11 is intended for use on sloping surfaces. Nevertheless, the parts employed are identical and are so described.

The weep valve 69 includes a flexible cover 70 forming a flap portion of the valve and which may be of rubber tube stock. The cover 70 carries a central metallic weight 71 for urging the cover over the mouth of the valve. The cover 70 is fastened adjacent its periphery by one or more bolts 72 to the flanged body mounting portion 74. A bolt 73 holds the weight 71 in place on the cover 70. A pipe-like body portion 75 extends downwardly from flange 74 and is provided with holes or slots 76 for access through its outer wall into an inner chamber 77.

When subterranean waters build up a sufficient hydrostatic head, water will enter the chamber 77 through the slots 76 and will be forced upward through the body portion 75. If the pressure is sufficient, the cover 70 is forced upward and the water may escape from the valve. On the other hand, surface waters may not flow down through the weep valve because of the seal formed by the cover 70 with the flanged body 74.

As indicated, weep or flap valves of the type hereinabove described are well known and in commercial use. Such valves are shown, for instance, in the publication "Linings for Irrigation Canals," United States Department of the Interior, Bureau of Reclamation, United States Printing Office, 1963.

Figure 10:
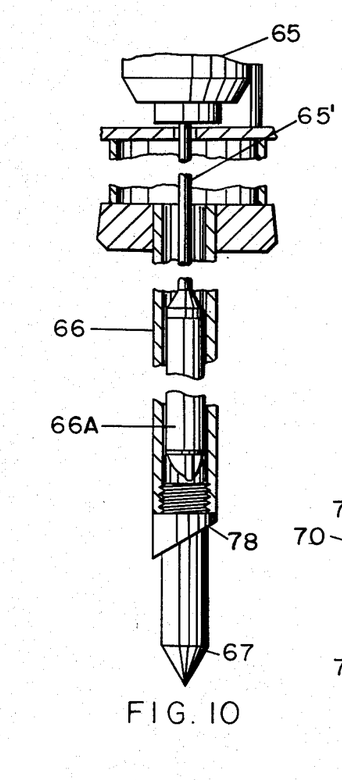
FIG. 10 is a cross-sectional view showing a vibrator and piercing-setting member arrangement particularly useful for sloped linings.

It will be noted from FIGS. 7 and 10 that the setting point 67 terminates in a flange 78 which conforms in shape to that of the upper surface of the flanged body mounting portion 74 of the weep valve. As will be later described, this flange 78 is designed to bear against the upper portion of this flange 74 during the setting operation.

Figure 12:
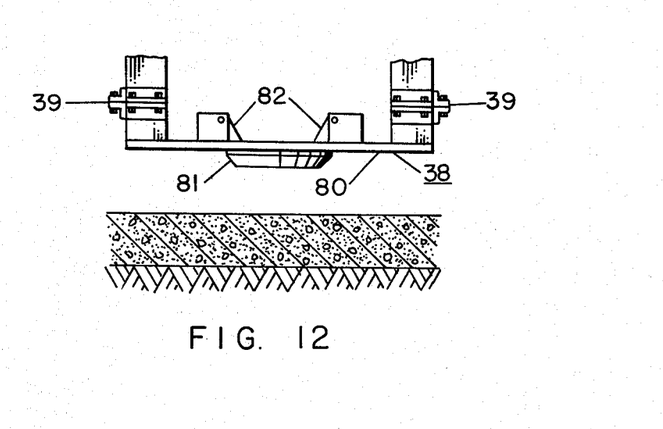
FIG. 12 is a diagrammatic view showing the relationship of the supporting setting collar with the lining and the earth, for horizontally-extending surfaces.
Figure 13:
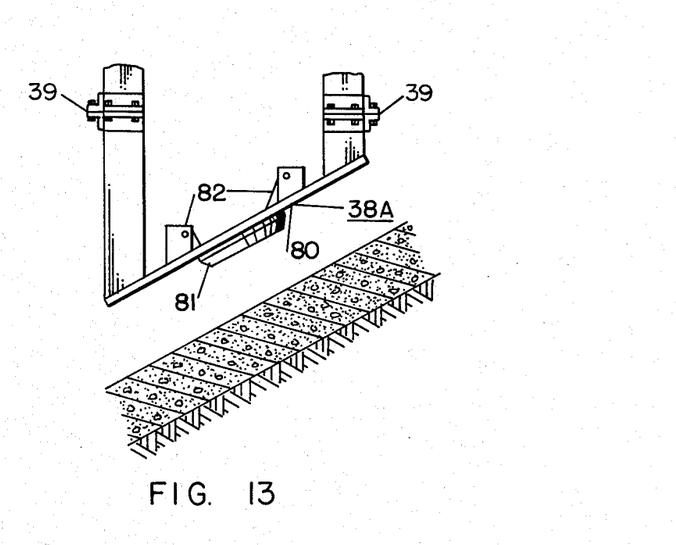
FIG. 13 is a view similar to FIG. 12, but showing sloped surfaces and mechanisms suitable therewith.
Figure 14:
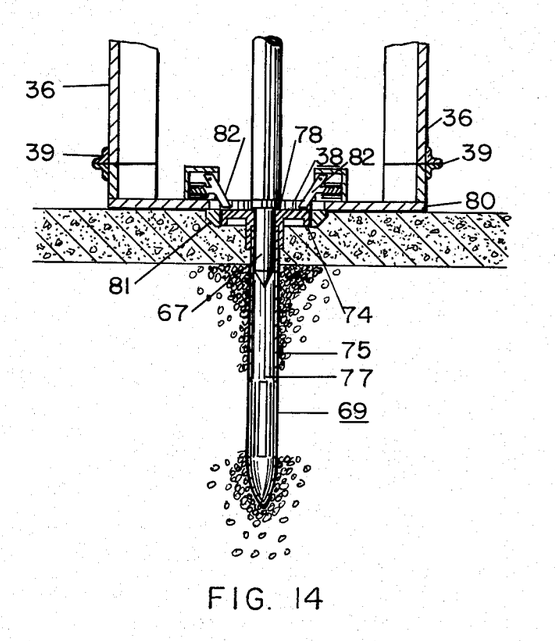
FIG. 14 is a partial sectional view showing a weep valve in position in the earth and through the lining, with the piercing-setting pin about to be withdrawn.

The piercing and setting operations may be more readily understood by reference to FIGS. 12–14. Those figures show in detail the templates 38 and 38A, for respective use with horizontal and sloped surfaces. These templates are of course identical except that the template 38A slopes in confirmation with the sloping work face. Each template is provided with a plate 80 which has extending therethrough a hole of equal diameter to the outer diameter of the mounting flange 74 of the weep valves. An annular ring 81 is welded to the bottom of plate 80 and provides a chamfer around the flange 74 when the weep valve is set into a plastic or semi-plastic blanket of a surface structure. Spring-operated latch members 82 are attached to the templates to hold the weep valves in position, after they are set, while the setting point 67 is withdrawn.

In operation of the apparatus, the compound lever assemblies 34 are first depressed to lower the piercing-setting unit C, with the template 38 or 38A, down to the elevation of the blanket or lining. The position of the lever assembly 34 at this time is shown in dotted lines in FIG. 1. During the piercing and setting operations, with the template in engagement with the lining, the friction therebetween tends to cause the piercing-setting assembly to remain in position, even though the associated mechanism furnishing the horizontal drive for the apparatus of the invention is moved forwardly.

Power is now simultaneously furnished to the driving motor 58 and the vibrator motor 65, so that the piercing-setting member 66, including point 67, is driven through the lining and into the subjacent earth, while the dislocated materials are compacted around the passage formed thereby. As a result, when the point 67 is withdrawn by reverse rotation of motor 58, while the vibrator motor 65 is turned off, a smooth-bore passage remains into which the weep valve may be set.

When the unit C has been completely retracted, a weep valve 69 with its cover 70 raised (not shown in FIG. 14 to avoid confusion) is placed over the piercing-setting point 67, with the flange 78 adjacent weep valve flange 74. The point 67 is of substantially the same diameter as the inner diameter of the weep valve, so that the valve remains on the point by reason of frictional engagement therebetween, during the successive downward movement caused by renewed motion of motor 58 and of vibrator 65. As the weep valve is driven into the passage previously made by the member 66, the material around the valve is caused to be consolidated about it by the vibration. When the valve is inserted far enough so that its flange reaches the latch assembly 82, the latch members are depressed against the spring forces while the flange 74 of the weep valve passes the latches. Then, after the flange passes the latches 82, the associated springs cause the latches to move outwardly to extend above the upper face of the flange 74.

The weep valve is customarily set into a position slightly lower than the upper surface of the lining, so that water movement above the valve may not cause the flap cover to be opened. When the valve is in such position, the vibrator may be turned off and the motor 58 reversed to cause withdrawal of the setting point 67. The latches 82 will then hold the valve against removal with the setting point 67.

After the piercing-setting mechanism C is raised to transport position, by reverse manipulation of the lever assemblies 34, the units B and C may then be rolled forwardly to their initial positions either manually or by appropriate mechanical means. It will be evident that the mounting frame A might be suitably tilted at a slight angle to the horizontal, to encourage forward movement of the raising and lowering assembly B, and therefore of the piercing-setting mechanism C. As a result, these units will be suitably biased against unintentional rearward movement during the forward motion of the apparatus with its driver or carrier.

Though the apparatus of the invention has been described as particularly useful in conjunction with setting of hydrostatic relief valves through linings, such as set concrete or asphalt, it may be also employed to set such valves in earth. Further, it is particularly useful to set weep valves in drains of the type constructed by the apparatus of our application Serial No. 352,866, filed March 18, 1964. It will be evident that when valves are set by apparatus of this invention in drains of the type therein disclosed, including a gravel core, or indeed into any fairly loose surface structure, that the vibrating mechanism by which the material surrounding the valve passage are consolidated, tends to cause the valves to be held in position in that passage to be prevented from removal therefrom by hydrostatic pressures.

It will further be evident that the roll-back feature of the invention by which the piercing-setting mechanism may be held in position, while the carrier moves horizontally, is not necessary in the event the carrier is independent of any other mechanism which may have to move forwardly during the piercing and setting operations.

It will further be evident that many minor changes could be made in the apparatus of the invention without departure from the scope thereof. Accordingly, the invention is not to be considered limited to the forms of the apparatus shown in this application, but rather only by the scope of the appended claims.

We claim:
1. The method of setting hydrostatic pressure relief valves through wearing linings over earth and into the earth comprising
   first, forming a passage for the valve through the wearing lining and into the earth,
   then connecting the valve to apparatus operable to vibrate it,
   and then moving the valve into that passage while simultaneously vibrating the valve by said apparatus to conform the passage to the configuration of the valve.
2. The method of setting relatively fragile hydrostatic pressure relief valves through wearing linings over earth and into gravel core drains beneath such linings comprising,
   first, forming a passage for the valve through the wearing lining and into the gravel core,
   then connecting the valve apparatus operable to vibrate it,
   and then moving the valve into that passage and into the gravel core while simultaneously vibrating the valve by said apparatus to conform the passage to the configuration of the valve.
3. The method of claim 2 in which the passage is formed by vibrating a piercing member through the wearing lining and into the gravel core.
4. Apparatus for piercing wearing linings over earth and the like and setting hydrostatic pressure relief valves through the linings and into the earth, comprising:
   a piercing-setting member operable when driven into the lining to form a passage therein,
   means connected to said member and operable to vibrate it as the member is driven through the lining to compact the materials surrounding the passage formed during the piercing operation, and to consolidate the materials surrounding the valve during the setting operation,
   a reciprocable unit mounting said member and said vibrating means,
   a vertically-extending support assembly carrying vertical-extending rack means,
   a drive motor mounted on said reciprocable unit,
   and gear means driven by the motor and engaged with said rack means, said reciprocable unit being mounted on said gear means in such fashion that the unit is selectively driven upward and downward to drive the piercing-setting member in the same directions, when the drive motor is supplied with power, depending on the direction of rotation of the gear means,
   said support assembly itself being movable between an upper position remote from the lining and a lower position adjacent the lining.
5. The apparatus of claim 4 in which said vibrating means and said piercing-setting member include a vertically-extending cylindrical member,
   a piercing-setting point attached at its upper end to said cylindrical member for support thereby,
   a rotatable eccentric extending within said cylindrical member,
   and motor means mounted on said reciprocable unit operable when supplied with power to rotate the eccentric to vibrate the cylindrical member and attached piercing-setting point.
6. The apparatus of claim 5 in which said eccentric is larger at its lower than at its upper end to provide a larger vibratory force at the lower end thereof.
7. The apparatus of claim 4 in which said support assembly includes a pair of spaced channel members extending vertically and attached together at upper and lower ends to define a space therebetween, said rack means including a vertically-extending rack carried by each channel member,
   said gear means including a shaft driven by said motor and carrying gears at its opposite ends engaging respective ones of said racks, said shaft being journalled in said reciprocable unit to carry the unit when the shaft is moved up and down by rotation thereof, said reciprocable unit being positioned in the space between said channel members of the support assembly.
8. The apparatus of claim 7 including a mounting frame adapted to be driven along the lining, and carriage means carrying said support assembly, said carriage means being mounted on said mounting frame for limited horizontal movement with respect thereto along the line of movement thereof, so that the drilling and setting operations may be effected even while the mounting frame is being driven horizontally.
9. The apparatus of claim 8 in which said mounting frame is an open box-like structure so formed as to define track ways extending in the direction of movement thereof, said carriage means having roller means positioned in said track ways and supporting the carriage means from the mounting frame, whereby the mounting frame may move forwardly with respect to the support assembly when the latter is held against forward movement.

References Cited by the Examiner
UNITED STATES PATENTS

| | | | |
|---|---|---|---|
| 1,908,217 | 4/33 | Blumenthal | 61—53.5 |
| 2,139,076 | 12/38 | Gates | 175—56 |
| 2,229,912 | 1/41 | Baily | 175—55 |
| 3,023,820 | 3/62 | Desvaux et al. | 175—55 |
| 3,076,513 | 2/63 | Heaphy | 175—55 |
| 3,106,258 | 10/63 | Muller | 175—19 |

BENJAMIN HERSH, *Primary Examiner.*

UNITED STATES PATENT OFFICE
CERTIFICATE OF CORRECTION

Patent No. 3,183,984                                               May 18, 1965

Harry D. Durston et al.

It is hereby certified that error appears in the above numbered patent requiring correction and that the said Letters Patent should read as corrected below.

Column 3, line 71, before "is of familiar" insert -- 34 --; column 6, line 4, for "chamfer" read -- champfer --; column 7, line 8, after "passage" insert -- and --; line 40, after "valve" insert -- to --.

Signed and sealed this 7th day of December 1965.

(SEAL)
Attest:

ERNEST W. SWIDER                                    EDWARD J. BRENNER
Attesting Officer                                           Commissioner of Patents